United States Patent
Miyahara et al.

(10) Patent No.: US 10,449,484 B2
(45) Date of Patent: Oct. 22, 2019

(54) MONOLITHIC SUBSTRATE, MONOLITHIC SEPARATION MEMBRANE STRUCTURE, AND METHOD FOR PRODUCING MONOLITHIC SUBSTRATE

(71) Applicant: NGK INSULATORS, LTD., Nagoya-Shi (JP)

(72) Inventors: Makoto Miyahara, Handa (JP); Makiko Ichikawa, Komaki (JP); Makoto Teranishi, Komaki (JP)

(73) Assignee: NGK Insulators, Ltd., Nagoya (JP)

( * ) Notice: Subject to any disclaimer, the term of this patent is extended or adjusted under 35 U.S.C. 154(b) by 198 days.

(21) Appl. No.: 15/260,666

(22) Filed: Sep. 9, 2016

(65) Prior Publication Data
US 2016/0375401 A1 Dec. 29, 2016

Related U.S. Application Data

(63) Continuation of application No. PCT/JP2015/055826, filed on Feb. 27, 2015.

(30) Foreign Application Priority Data

Mar. 28, 2014 (JP) .................................. 2014-069300

(51) Int. Cl.
*B01D 53/22* (2006.01)
*B01D 63/06* (2006.01)
(Continued)

(52) U.S. Cl.
CPC ......... *B01D 53/225* (2013.01); *B01D 63/062* (2013.01); *B01D 63/066* (2013.01);
(Continued)

(58) Field of Classification Search
None
See application file for complete search history.

(56) References Cited

U.S. PATENT DOCUMENTS 3,488,829 A * 1/1970 Boniface ............... F28F 11/02
228/119
5,437,310 A * 8/1995 Cunningham ...... F16L 55/1141
138/89
(Continued)

FOREIGN PATENT DOCUMENTS

CN 1530163 A 9/2004
CN 1835831 A 9/2006
(Continued)

OTHER PUBLICATIONS

Extended European Search Report (Application No. 15768825.0) dated Oct. 24, 2017.
(Continued)

*Primary Examiner* — Chester T Barry
(74) *Attorney, Agent, or Firm* — Burr & Brown, PLLC

(57) ABSTRACT

A monolithic substrate comprises a porous base material body, a first support portion, a first cell seal portion, a second support portion, and a second cell seal portion. The base material body includes a plurality of cells respectively passing from a first end surface to a second end surface. The first support portion contains ceramics as an aggregate material, and is packed into the first end portion of a seal target cell. The first cell seal portion contains glass, and is disposed on an outer surface of the first support portion. The second support portion contains ceramics as an aggregate material, and is packed into the second end surface of the seal target cell. The second cell seal portion contains glass, and is disposed on an outer surface of the second support portion.

3 Claims, 5 Drawing Sheets

(51) Int. Cl.
 B01D 71/02 (2006.01)
 C04B 35/111 (2006.01)
 C04B 35/63 (2006.01)
 B01D 71/04 (2006.01)
 C04B 33/04 (2006.01)
 C04B 33/32 (2006.01)
 C04B 38/00 (2006.01)
 C04B 111/00 (2006.01)

(52) U.S. Cl.
 CPC ......... *B01D 71/024* (2013.01); *B01D 71/025* (2013.01); *B01D 71/027* (2013.01); *B01D 71/04* (2013.01); *C04B 33/04* (2013.01); *C04B 33/32* (2013.01); *C04B 35/111* (2013.01); *C04B 35/6303* (2013.01); *C04B 38/0012* (2013.01); *C04B 2111/00793* (2013.01); *C04B 2235/5436* (2013.01); *C04B 2235/6021* (2013.01)

(56) References Cited

U.S. PATENT DOCUMENTS

| | | | | |
|---|---|---|---|---|
| 2006/0151926 | A1* | 7/2006 | Zoeller, III | F01N 3/0222 264/603 |
| 2006/0257620 | A1* | 11/2006 | Noguchi | B01D 46/0001 428/116 |
| 2008/0093291 | A1* | 4/2008 | Isomura | B01D 67/0048 210/500.26 |
| 2009/0140467 | A1* | 6/2009 | Calkins, Jr. | B01D 46/0001 264/426 |
| 2012/0074061 | A1 | 3/2012 | Teranishi et al. | |
| 2012/0247224 | A1* | 10/2012 | Miyashita | B01D 65/10 73/861 |
| 2012/0272826 | A1* | 11/2012 | Uchikawa | B01D 53/228 96/8 |
| 2013/0001156 | A1* | 1/2013 | Takeno | B01D 61/362 210/497.01 |
| 2013/0112078 | A1* | 5/2013 | Takagi | C04B 35/14 96/11 |
| 2013/0323419 | A1* | 12/2013 | Chang | B01D 63/066 427/243 |
| 2014/0263337 | A1* | 9/2014 | Al-Otaibi | F16L 55/13 220/284 |
| 2016/0375401 | A1* | 12/2016 | Miyahara | B01D 63/066 210/500.26 |

FOREIGN PATENT DOCUMENTS

| | | |
|---|---|---|
| CN | 102735598 A | 10/2012 |
| EP | 1 457 243 A1 | 9/2004 |
| JP | 08-131786 A1 | 5/1996 |
| JP | 2004-305993 A1 | 11/2004 |
| WO | 2010/134514 A1 | 11/2010 |
| WO | 2011/122059 A1 | 10/2011 |

OTHER PUBLICATIONS

International Search Report and Written Opinion (Application No. PCT/JP2015/055826) dated Jun. 2, 2015.
English translation of International Preliminary Report on Patentability (Chapter I) (Application No. PCT/JP2015/055826) dated Oct. 13, 2016.
Chinese Office Action (with English translation), Chinese Application No. 201580009165.8, dated Mar. 4, 2019 (21 pages).

* cited by examiner

MONOLITHIC SUBSTRATE, MONOLITHIC SEPARATION MEMBRANE STRUCTURE, AND METHOD FOR PRODUCING MONOLITHIC SUBSTRATE

BACKGROUND OF THE INVENTION

1. Field of the Invention

The present invention relates to a monolithic substrate, a monolithic separation membrane structure, and to a method of producing the monolithic substrate.

2. Description of Related Art

A method is known in which a solvent-resistant substance is coated onto a area on which residual coloring agent is present after coating onto a surface of a ceramic membrane for the purpose of inspecting or repairing a defect in the ceramic membrane formed on an outer surface of a porous support body (see Japanese Patent Application Laid-Open No. 08-131786).

SUMMARY OF THE INVENTION

Technical Problem

A monolithic separation membrane structure that includes a monolithic substrate forming a plurality of cells in an inner portion thereof and a separation membrane formed on an inner surface of the cells is associated with a risk of membrane formation failure of the separation membrane or a reduction in pressure-resistant properties when there is a defect on an inner surface of a cell.

In this context, although it is necessary to inspect and repair defects on an inner surface of a cell, since the interior of a cell is not capable of visual inspection, there are difficulties associated with use of the method disclosed in Patent Literature 1.

Consequently, there is a need for selective sealing of a cell associated with a risk of producing a defect on an inner surface.

The present invention is proposed in light of the situation described above, and has the purpose of providing a monolithic substrate, a monolithic separation membrane structure and a method of producing the monolithic substrate that enable to seal a desired cell in a simple manner.

Solution to Problem

The monolithic substrate includes a porous base material body, a first support portion, a first cell seal portion, a second support portion, and a second cell seal portion. The base material body includes a plurality of cells respectively passing from a first end surface to a second end surface. The first support portion contains ceramics as an aggregate material, and is packed into a first end portion of a predetermined cell of the plurality of cells. The first cell seal portion contains glass, and is disposed on an outer surface of the first support portion. The second support portion contains ceramics as an aggregate material, and is packed into a second end surface of the predetermined cell. The second cell seal portion contains glass, and is disposed on an outer surface of the second support portion.

Effect of Invention

The present invention enables the provision of a monolithic substrate, a monolithic separation membrane structure and a method of producing the monolithic substrate that enable to seal a desired cell in a simple manner.

DETAILED DESCRIPTION OF THE INVENTION

Figure 1:
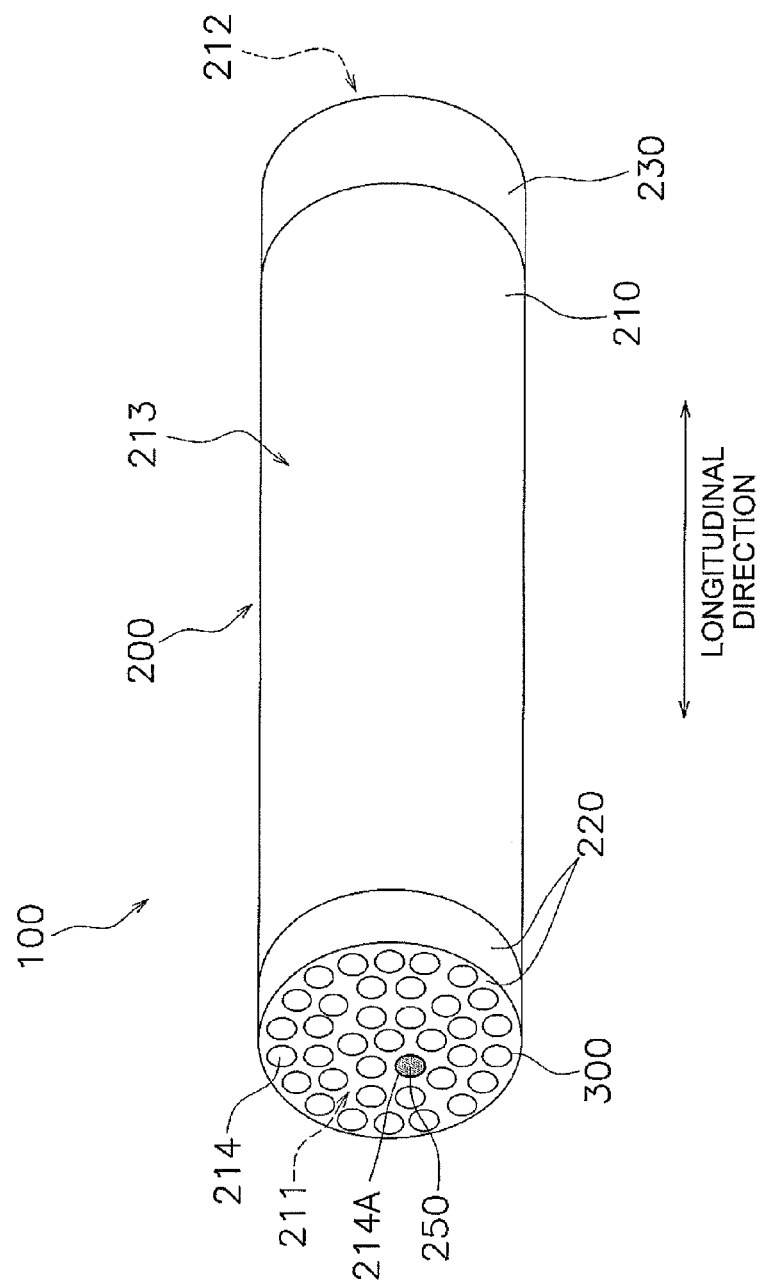
FIG. 1 is a perspective view illustrating a monolithic separation membrane structure.

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different.

Structure of Monolithic Separation Membrane Structure 100

Figure 2:
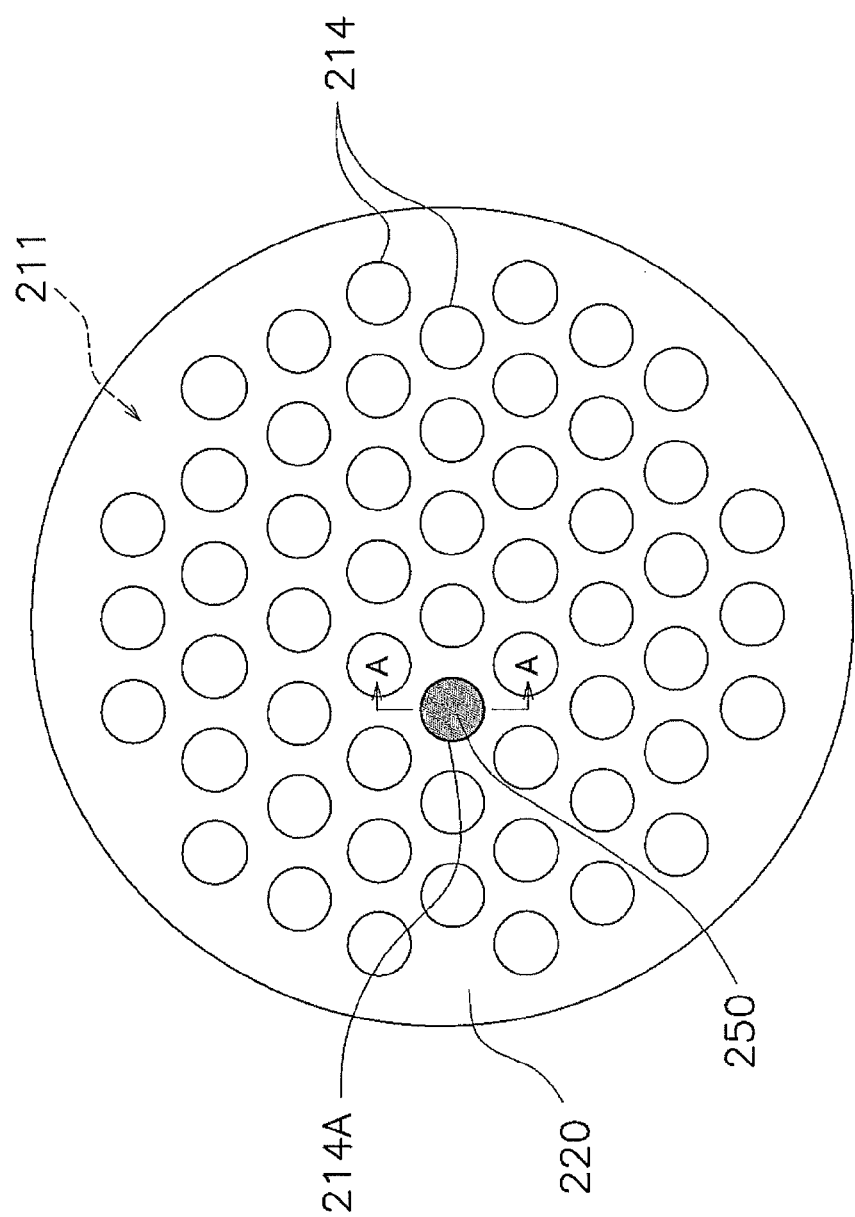
FIG. 2 illustrates a plan view of a first end surface of the monolithic separation membrane structure.
Figure 3:
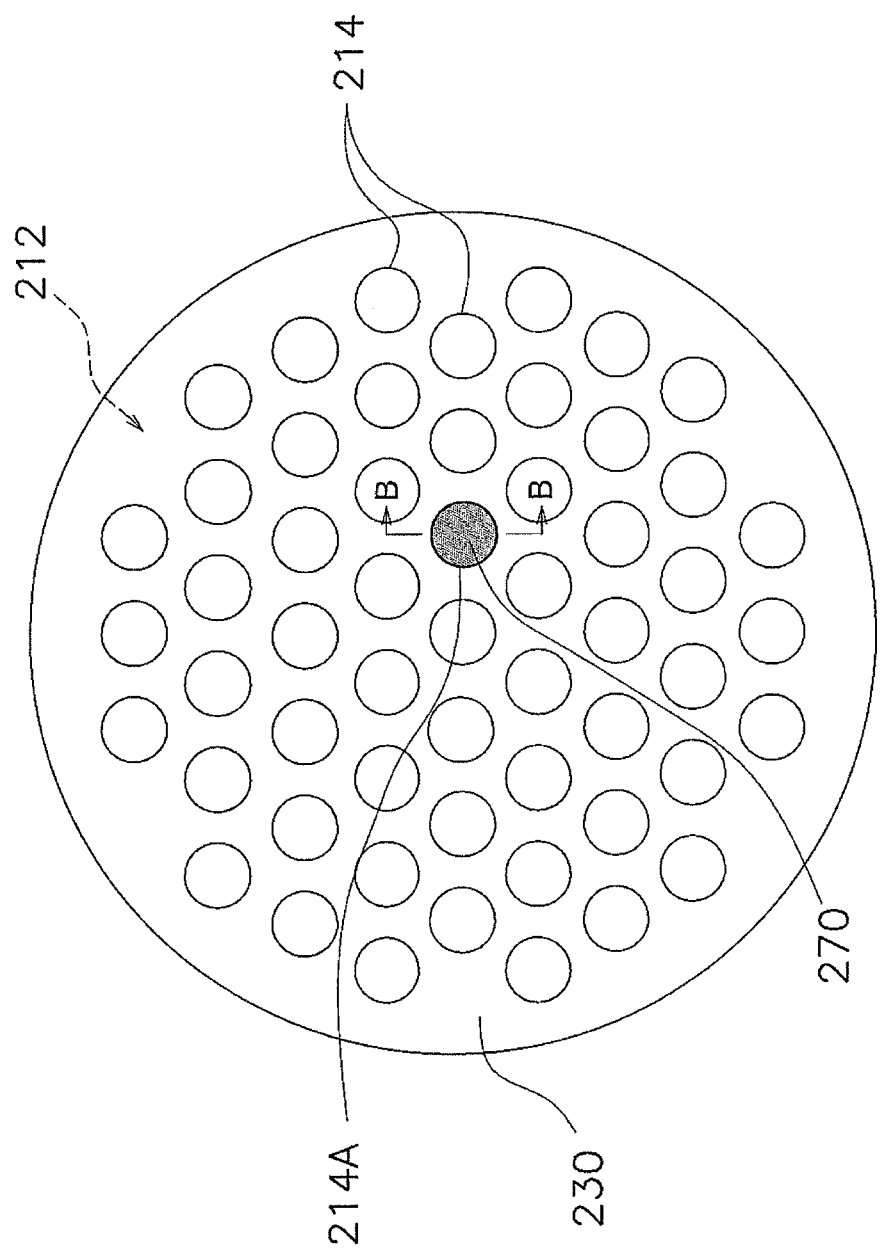
FIG. 3 illustrates a plan view of a second end surface of the monolithic separation membrane structure.
Figure 4:
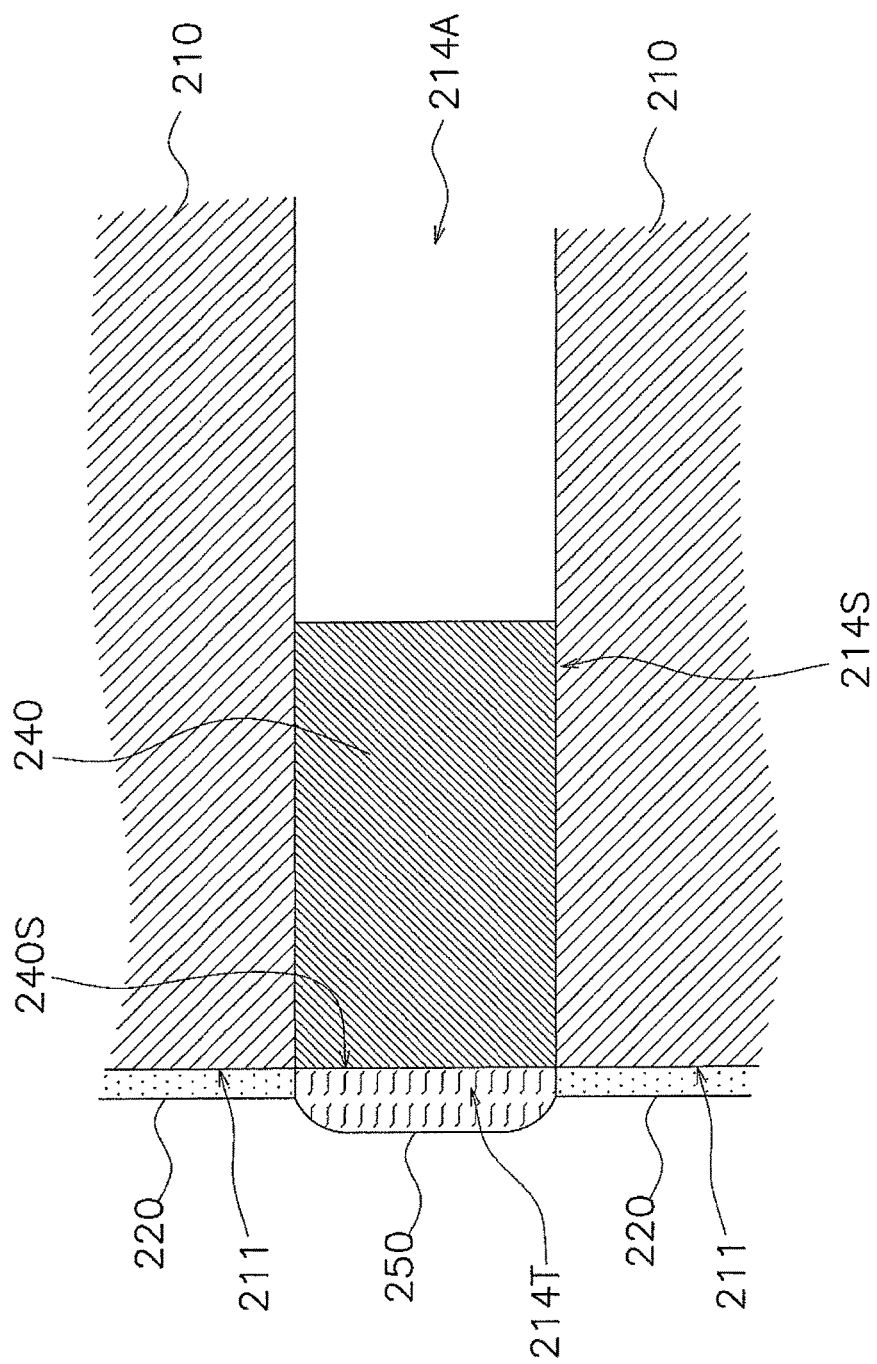
FIG. 4 illustrates a sectional view along the line A-A of FIG. 2.
Figure 5:
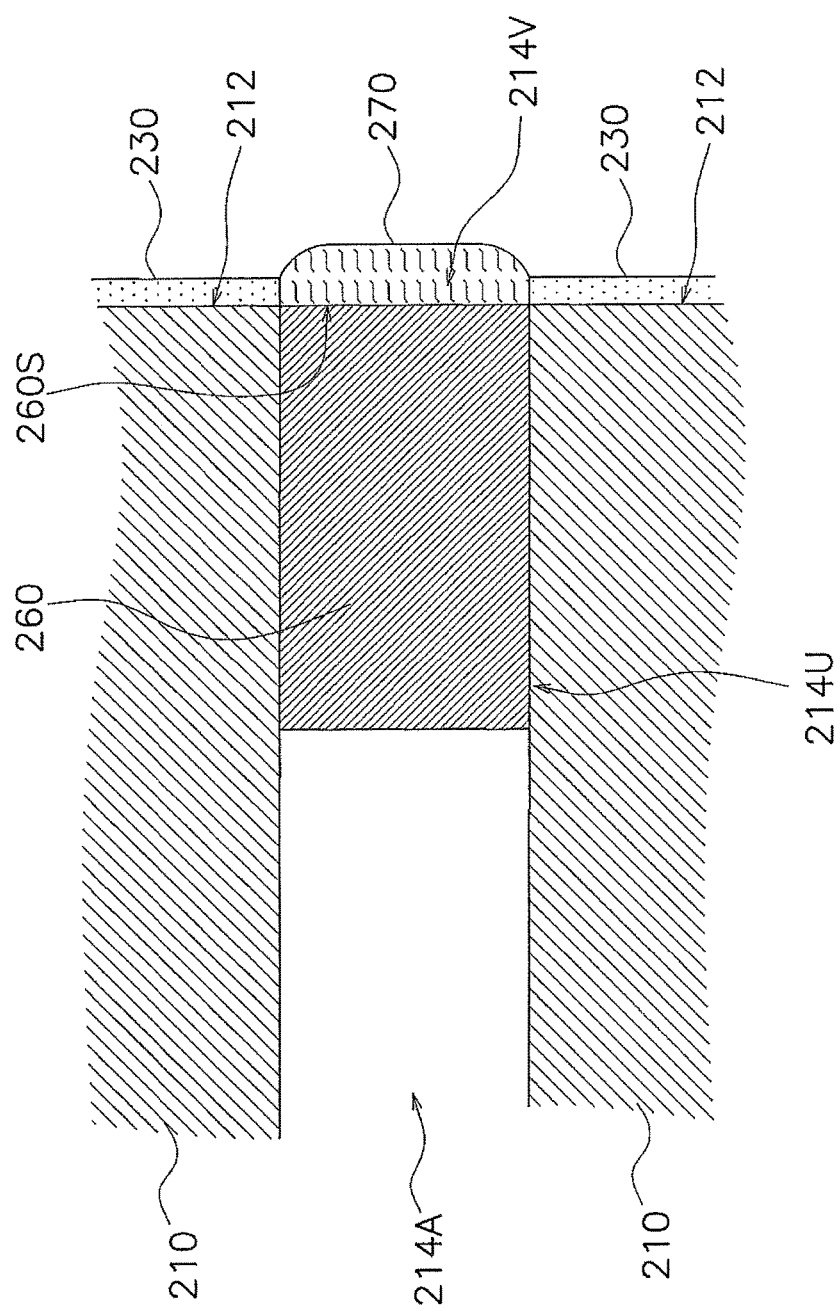
FIG. 5 illustrates a sectional view along the line B-B of FIG. 3.

FIG. 1 is a perspective view illustrating a monolithic separation membrane structure 100. FIG. 2 illustrates a plan view of a first end surface 211 of the monolithic separation membrane structure 100. FIG. 3 illustrates a plan view of a second end surface 212 of the monolithic separation membrane structure 100. FIG. 4 illustrates a sectional view along the line A-A of FIG. 2. FIG. 5 illustrates a sectional view along the line B-B of FIG. 3.

The monolithic separation membrane structure 100 includes a monolithic substrate 200 and a separation membrane 300.

As illustrated in FIG. 1, FIG. 4 and FIG. 5, the monolithic substrate 200 includes a base material body 210, a first body seal portion 220, a second body seal portion 230, a first support portion 240, a first cell seal portion 250, a second support portion 260, and a second cell seal portion 270.

The base material body 210 is configured by a porous material. The porous material includes use of ceramics, metal, resin, or the like. In particular, use of a porous ceramic is preferred. The aggregate particles used in relation to the porous ceramic material include alumina ($Al_2O_3$), titania ($TiO_2$), mullite ($Al_2O_3 \cdot SiO_2$), potsherd, and cordierite ($Mg_2Al_4Si_5O_{18}$), and in particular, alumina is preferred in light of ease of availability, formation of a stable clay, and anticorrosive properties. The support body 211 may include an inorganic binder in addition to the porous material. The inorganic binder may include at least one of titania, mullite, sinterable alumina, silica, glass frits, clay minerals, and sinterable cordierite.

The base material body 210 is formed as a circular cylinder. The length of the base material body 210 in a longitudinal direction is 150 to 2000 mm, and the diameter of the base material body 210 in the short width direction is 30 to 220 mm. However there is no limitation in this regard.

The base material body 210 has a first end surface 211, a second end surface 212, a side surface 213, and a plurality of cells 214. The first end surface 211 is provided opposite to the second end surface 212. The side surface 213 is connected to the first end surface 211 and the second end surface 212. The plurality of cells 214 is a passage for a mixed fluid that is the object of filtration. The cells 214 pass through the base material body 210 from the first end surface 211 to the second end surface 212. The sectional shape of the cells 214 is circular. The diameter of the cells 214 is 1 to 5 mm, however there is no limitation in this regard.

In this context, as illustrated in FIG. 1, the plurality of cells 214 includes a seal target cell 214A (an example of a "predetermined cell"). Since the seal target cell 214A is distorted in a longitudinal direction, that cell is a cell that has a risk of failure when a high load is applied. Consequently, in the present embodiment, the cell is isolated from an outer portion by the first cell seal portion 250 (reference is made to FIG. 4) and the second cell seal portion 270 (reference is made to FIG. 5) to prevent inflow of a mixed fluid into the seal target cell 214A.

The first body seal portion 220 inhibits direct inflow, from the first end surface 211 to the base material body 210, of the mixed fluid that flows in the cells 214. The first body seal portion 220 covers a portion of the first end surface 211 and the side surface 213. The first body seal portion 220 is formed so that a barrier is not formed in relation to the input port for the plurality of cells 214.

The material that configures the first body seal portion 220 includes use of glass, metal, a fluoro-resin, or the like. However, glass is preferred in light of adaptability with the thermal expansion coefficient of the base material body 210. Although there is no particular limitation in relation to the glass used in the first body seal portion 220 as long as it is glass that can be used as a seal member for a water treatment filter, a non-alkali glass is preferred. Since the use of a non-alkali glass suppresses a buildup of alkali components of the first body seal portion 220 at the interface of the separation membrane 300 or the base material body 210, it is possible to enhance the anti-corrosive properties of the monolithic separation membrane structure 100.

When the first body seal portion 220 includes glass, ceramic particles may be dispersed in the glass. The ceramic particles are preferably uniformly dispersed in the glass. The content ratio of ceramic particles in the first body seal portion 220 is preferably 5 mass % to 70 mass %, and more preferably 10 mass % to 50 mass %. It is possible to inhibit crack formation in the first body seal portion 220 during long term use under high temperature conditions by configuring the content ratio of ceramic particles to be at least 5 mass %. A reduction in the mechanical strength of the first body seal portion 220 can be suppressed by configuring the content ratio of ceramic particles to be less than or equal to 70 mass %.

The coefficient of thermal expansion of the ceramic particles is preferably 90% to 110% of the coefficient of thermal expansion of the glass. In this manner, during firing of the first body seal portion 220, it is possible to suppress crack formation due to a difference between the coefficient of thermal expansion of the glass and the ceramic particles. Furthermore, the ceramic particles preferably do not decompose in the glass. Materials used for such types of ceramic particles include alumina, titania, or the like. When the ceramic particles are the same type of material as the porous material for the base material body 210, since the difference in the coefficient of thermal expansion of the first body seal portion 220 and the base material body 210 is small, it is possible to inhibit crack formation in the first body seal portion 220 during long term use under high temperature conditions.

The second body seal portion 230 inhibits inflow, from the second end surface 212 to the base material body 210, of the mixed fluid that flows from the cells 214. The second body seal portion 230 covers a portion of the second end surface 212 and the side surface 213. The second body seal portion 230 is formed so that a barrier is not formed in relation to the input port for the plurality of cells 214. The second body seal portion 230 may be configured by use of the same material as the first body seal portion 220.

As illustrated in FIG. 4, the first support portion 240 is packed into the first end portion 214S of the seal target cell 214A. The thickness of the first support portion 240 in the longitudinal direction (that is to say, the packing depth) is preferably at least 1 mm. The first support portion 240 contains an aggregate material of ceramic. The first support portion 240 may exhibit air-tight and liquid-tight characteristics. The ceramic used as the aggregate material is preferably the same type of ceramic as that used in the base material body 210 to match the coefficient of thermal expansion of the base material body 210. The first support portion 240 may contain glass. The temperature during sintering of the first support portion 240 can be reduced as a result of inclusion of glass in the first support portion 240.

The first support portion 240 may contain an inorganic binder. The inorganic binder may be the same material as that used in the base material body 210.

As illustrated in FIG. 4, the first cell seal portion 250 is disposed on an outer surface 240S of the first support portion 240. The first cell seal portion 250 is supported by the first support portion 240, and in that manner, maintains the strength of the first cell seal portion 250 itself. The first cell seal portion 250 is disposed to close a first opening 214T of the seal target cell 214A. Therefore, inflow of the mixed fluid into the seal target cell 214A is inhibited.

It is preferred that the first cell seal portion 250 makes contact with the entire periphery of the first body seal portion 220. That is to say, the first cell seal portion 250 is preferably configured to close the holes formed in the first body seal portion 220. In this configuration, a portion of the first cell seal portion 250 may be disposed on the surface of the first body seal portion 220.

The first cell seal portion 250 is configured from a material that exhibits air-tight and liquid-tight characteristics. This type of material includes the use of glass. The glass used in the first cell seal portion is a glass that can be used in the seal member of a water treatment filter. When glass is included in the first body seal portion 220, the glass of the first cell seal portion 250 is preferably the same type as the glass of the first body seal portion 220. In this manner, crack production in proximity to the interface between the first body seal portion 220 and the first cell seal portion 250 during long term use under high temperature conditions can be inhibited.

Ceramic particles may be dispersed in the first cell seal portion 250. The ceramic particles are preferably uniformly dispersed in the glass. The content ratio of ceramic particles in the first cell seal portion 250 is preferably 5 mass % to 70 mass %, and more preferably 10 mass % to 50 mass %. It is possible to inhibit crack formation in the first cell seal portion 250 during long term use under high temperature conditions by configuring the content ratio of ceramic particles to be at least 5 mass %. A reduction in the mechanical strength of the first cell seal portion 250 can be suppressed by configuring the content ratio of ceramic particles to be less than or equal to 70 mass %.

The coefficient of thermal expansion of the ceramic particles is preferably 90% to 110% of the coefficient of thermal expansion of the glass. In this manner, during firing of the first cell seal portion 250, it is possible to suppress crack formation due to a difference between the coefficient of thermal expansion of the glass and the ceramic particles. Furthermore, the ceramic particles preferably do not decompose in the glass. Materials used as such types of ceramic particles include alumina, titania, or the like.

When ceramic particles are dispersed in the glass used in the first body seal portion 220, the ceramic particles dispersed in the glass in the first cell seal portion 250 are preferably the same type as the ceramic particles dispersed in the glass of the first body seal portion 220. In this manner, crack production in proximity to the interface between the first body seal portion 220 and the first cell seal portion 250 during long term use under high temperature conditions can be inhibited.

As illustrated in FIG. 5, the second support portion 260 is packed into the second end portion 214U of the seal target cell 214A. The thickness of the second support portion 260 in the longitudinal direction (that is to say, the packing depth) is preferably at least 1 mm. The second support portion 260 contains an aggregate material of ceramic. The second support portion 260 may exhibit air-tight and liquid-tight characteristics. The ceramic used as the aggregate material is preferably the same type of ceramic as that used in the base material body 210 to match the coefficient of thermal expansion of the base material body 210. The second support portion 260 may contain glass. The temperature during sintering of the second support portion 260 can be reduced as a result of inclusion of glass in the second support portion 260.

As illustrated in FIG. 5, the second cell seal portion 270 is disposed on an outer surface 260S of the second support portion 260. The second cell seal portion 270 is support by the second support portion 260, and in that manner, maintains the strength of the second cell seal portion 270 itself. The second cell seal portion 270 is disposed to close a second opening 214V of the seal target cell 214A. The second cell seal portion 270 is configured from glass and exhibits air-tight and liquid-tight characteristics. Therefore, inflow of the mixed fluid into the seal target cell 214A can be inhibited.

It is preferred that the second cell seal portion 270 makes contact with the entire periphery of the second body seal portion 230. That is to say, the second cell seal portion 270 is preferably configured to close the holes formed in the second body seal portion 230. A portion of the second cell seal portion 270 may be disposed on the surface of the second body seal portion 230.qq The second cell seal portion 270 is configured from a material that exhibits air-tight and liquid-tight characteristics. The second cell seal portion 270 can be configured from the same type of material as the first body seal portion 220.

The separation membrane 300 is formed on an inner side of a cell other than the seal target cell 214A of the plurality of cells 214. A plurality of pores is formed in an inner portion of the separation membrane 300. The average pore diameter of the separation membrane 300 is smaller than the average pore diameter of the base material body 210, and may be suitably adjusted in response to the particle size of the substance to be removed that is contained in the mixed fluid.

The separation membrane 300 may be configured as a gas separation membrane, a pervaporation membrane, or a reverse osmosis membrane. The separation membrane 300 is preferably configured from an inorganic material. The inorganic material includes zeolite, carbon, silica, or the like. When the separation membrane 300 is configured as a zeolite membrane, a zeolite having a crystal structure such as LTA, MFI, MOR, FER, FAU, DDR, CHA, BEA, or the like can be used. When the separation membrane 300 is configured as a DDR type zeolite membrane, it may be used as a gas separation membrane for selective removal of carbon dioxide.

Method of Manufacturing Monolithic Separation Membrane Structure 100

A green body for the base material body 210 is formed by extrusion molding using a vacuum extrusion molding device.

Then, a base material body 210 is formed with a plurality of cells 214 by firing of the green body for the base material body 210.

Next, a slurry for the body seal portions is prepared by mixing water and an organic binder into the material for the first and second body seal portions 220, 230. As stated above, the slurry for the body seal portions may contain glass and ceramic particles.

The first body seal portion 220 and the second body seal portion 230 are formed by coating and firing (800 to 900 degrees C.) the slurry for the body seal portion onto both end portions of the base material body 210.

Next, visual observation is performed to confirm whether or not the cell 214 is distorted in a longitudinal direction. Then, a bubble point test is performed to confirm whether or not there is an inner defect in the cell 214. The bubble point test is a test method that specifies a cell having an inner defect as a cell that produces a bubble when supplying air under pressure to the inner surface 214 of the base material body 210 in a state in which water is packed into the cell. In this embodiment, a configuration is presumed in which a defect is identified in the seal target cell 214A of the plurality of cells 214 during a bubble point test or visual confirmation of a distortion.

Next, green bodies for the first support portions 240 and the second support portion 260 is formed by packing a material using ceramics aggregate material into both end portions of the seal target cell 214A. The packing material preferably includes an inorganic binder, binder, thickener, and moisture retention agent in addition to the aggregate material. The binder may be at least one compound selected from the group consisting of polyvinyl alcohol, polyethylene glycol, starch, and clay. The addition amount of the binder is preferably 0.08 to 0.12 parts by mass to 100 parts by mass of the aggregate particles. The thickener includes use of methyl cellulose, or carboxymethylcellulose, or the like. The addition amount of the thickener is preferably 0.04 to 0.1 parts by mass to 100 parts by mass of the aggregate particles. The moisture retention agent includes use of starch, glycerine, or the like. The addition amount of the moisture retention agent is preferably 5 to 6 parts by mass to 100 parts by mass of the aggregate particles. In the present embodiment, the sintering temperature of the packing material is preferably lower than the melting point of the first and second body seal portions 220, 230.

The first support portion 240 and the second support portion 260 are formed by firing a green body for the first support portion 240 and the second support portion 260 (700 to 900 degrees C.). The firing temperature is preferably lower than the melting point of the first and second body seal portions 220, 230. In this manner, it is possible to inhibit melting of the first and second body seal portions 220, 230 that have been formed in advance.

Next, a slurry for the cell seal portions is prepared by mixing water and an organic binder into glass frit used for the first and second cell seal portions 250, 270. As stated above, the cell seal portion slurry may contain a mixture of ceramic particles.

The first cell seal portion 250 and the second cell seal portion 270 are formed by coating and firing (800 to 900 degrees C.) the slurry for the cell seals portions onto the outer surface 240S of the first support portion 240 and the outer surface 260S of the second support portion 260. The firing temperature is preferably lower than the melting point of the first and second body seal portions 220, 230. In this manner, it is possible to inhibit melting of the first and second body seal portions 220, 230 that have been formed in advance.

Next, a separation membrane 300 is formed on an inner surface of a cell of the plurality of cells 214 other than the seal target cell 214A.

Operation and Effect

The monolithic substrate 200 of the present embodiment includes a porous base material body 210, a first support portion 240, a first cell seal portion 250, a second support portion 260, and a second cell seal portion 270. The base material body 210 includes a plurality of cells 214 respectively passing from the first end surface 211 to the second end surface 212. The first support portion 240 includes ceramics as an aggregate material, and is packed into the first end portion 214S of the seal target cell 214A. The first cell seal portion 250 contains glass, and is disposed on an outer surface 240S of the first support portion 240 to close the first opening 214T of the seal target cell 214A. The second support portion 260 contains an aggregate material of ceramic, and is packed into the second end surface 214U of the seal target cell 214A. The second cell seal portion 270 contains glass, and is disposed on an outer surface 260S of the second support portion 260 to close the second opening 214V of the seal target cell 214A.

In this manner, since it is possible to seal the seal target cell 214A in a simple manner by the first cell seal portion 250 and the second cell seal portion 270, the seal target cell 214A that is associated with a risk of producing a membrane defect can be removed from the membrane formation objects of the separation membrane 300.

Furthermore, since the first cell seal portion 250 is supported by the first support portion 240 and the second cell seal portion 270 is supported by the second support portion 260, damage to the first cell seal portion 250 and the second cell seal portion 270 by the pressure of the mixed fluid can be inhibited.

Other Embodiments

Although an embodiment of the present invention has been described, the present invention is not limited to the above embodiment, and various modifications are possible within a scope that does not depart from the spirit of the invention.

(A) Although there is no particular disclosure in the above embodiment, the inner surface of the cell 214 may include formation of an intermediate layer having an average particle diameter that is less than the base material body 210, or a surface layer that is formed on an inner surface of the intermediate layer. In this configuration, the preparation of the first support portion 240, the first cell seal portion 250, the second support portion 260 and the second cell seal portion 270 may be performed either before or after the formation step for the intermediate layer, or before or after the formation step of the surface layer.

(B) In the above embodiment, although the base material body 210 was formed in a cylindrical shape, a polygonal cylinder or ovoid shape is also possible.

(C) In the above embodiment, although the sectional shape of the cell 214 is circular, a polygonal or oval shape is also possible.

(D) In the above embodiment, after formation of the first and second body seal portions 220, 230, the first and second support portions 240, 260, and the first and second cell seal portions 250, 270 were formed in sequence. However there is no limitation in this regard.

Before the formation of the first and second body seal portions 220, 230, the first and second support portions 240, 260, and the first and second cell seal portions 250, 270 may be formed in sequence. Furthermore, after the formation of the first and second support portions 240, 260, the first and second cell seal portions 250, 270 and the first and second body seal portions 220, 230 may be integrally formed by use of the same material. In the above configurations, there is no requirement for the firing temperature of the first and second support portions 240, 260 to be lower than the melting point of the first and second body seal portions 220, 230.

Since a bubble point test cannot be performed before formation of the first and second body seal portions 220, 230, when the first and second support portions 240, 260 are formed before the first and second body seal portions 220, 230, the seal target cell 214A can be specified by visual inspection.

(E) In the above embodiment, the green body for the first and second support portions 240, 260 was fired separately from the green body for the first and second cell seal portions 250, 270. However, the green body for the first and second support portions 240, 260 may be fired at the same time as the green body for the first and second cell seal portions 250, 270. In this manner, the first and second support portions 240, 260 and the first and second cell seal portions 250, 270 can be formed in a single firing step and thereby enable a reduction in manufacturing costs.

(F) In the above embodiment, although the respective first and second body seal portions 220, 230 cover a portion of the side surface 213, there is no limitation in this regard. The first body seal portion 220 may cover the first end surface 211, and the second body seal portion 230 may cover the first end surface 212.

EXAMPLES

The examples of the present invention will be described below. However, the present invention is not thereby limited to the following examples.

Preparation of Sample No. 1

A monolithic substrate for Sample No. 1 was prepared as described below.

Firstly, 20 parts by mass of an inorganic binder was added to 100 parts by mass of alumina having an average particle diameter of 50 micrometers, then water, a dispersing agent and a thickener were added, and the mixture was kneaded to prepare a clay.

Next, a green body for the monolithic substrate was prepared by extrusion molding of the clay.

Next, the green body for the monolithic substrate was fired (1250 degrees C., 1 hour).

Next, glass was coated and fired onto both end surfaces of the monolithic substrate (950 degrees C., 3 hours) to thereby form a pair of body seal portions. At this time, the glass was coated to avoid closure of the opening of the cell on both end surfaces.

Next, visual inspection was used to confirm and specify a seal target cell that was distorted in a longitudinal direction. Furthermore, a bubble point test was performed to specify the seal target cell that had produced an internal defect.

The seal target cell in relation to which a distortion or internal defect had been identified was sealed. More specifically, a pair of support portions was formed by packing to 5 mm and firing (900 degrees C., 1 hour) of a mixed material of glass and alumina into both end portions of the seal target cell. Then, glass was coated and fired (950 degrees C., 3 hours) onto the respective surfaces of the pair of support portions to thereby form a pair of cell seal portions.

Next, a DDR zeolite membrane was formed as a separation membrane on the inner surface of each cell.

Preparation of Samples No. 2 to No. 5

A monolithic substrate according to Sample No. 2 to No. 5 was prepared in the same manner as Sample No. 1. However, in Sample No. 2, after forming the support portion and the cell seal portion in sequence, the main body seal portion was formed. In Sample No. 3, in substitution for a DDR zeolite membrane, a carbon membrane was formed as the separation membrane. In Sample No. 4, a resin material filling both end portions of the seal target cell was cured (25 degrees C., 24 hours) to thereby form the support portion. In Sample No. 5, the seal target cell was left in an open configuration without forming a cell seal portion and support portion.

Dye Testing after Application of Pressure

After application of pressure (8 MPa) to the monolithic substrate in Sample Nos. 1 to No. 5, a dye agent is introduced into the cell. The presence or absence of a cell in which there is residual dye agent after washing of the dye agent is confirmed and the confirmation results are shown in Table 1.

Dye Test after Heating

After application of heating (400 degrees C.) to the monolithic substrate in Sample Nos. 1 to No. 5, a dye agent is introduced into the cell. The presence or absence of a cell in which there is residual dye agent after washing of the dye agent is confirmed and the confirmation results are shown in Table 1.

TABLE 1

| Sample No. | Seal of Seal Target Cell | Separation Membrane | Dye Color after Application of Pressure | Dye Color after Heating |
|---|---|---|---|---|
| 1 | ceramic and glass | DDR | No | No |
| 2 | ceramic and glass | DDR | No | No |
| 3 | ceramic and glass | Carbon | No | No |
| 4 | resin | DDR | No | Yes |
| 5 | none | DDR | Yes | Yes |

As shown in Table 1, there is no confirmation of a cell in Sample No. 1 to No. 3 in which there is residual dye agent after both pressure application and heating. Therefore it is confirmed that the seal target cell associated with a risk of membrane defect production is sealed by the glass cell seal portion and the support portion using an aggregate material of ceramic.

On the other hand, it is confirmed that there are cells in Sample No. 4 in which there is residual dye agent after heating. This feature is thought to result from the deterioration of the resin cell seal portion due to heating.

Sample No. 5 in which the seal target cell is not sealed is confirmed to exhibit residual dye agent after both pressure application and heating.

The invention claimed is:

1. A monolithic separation membrane structure comprising:
    a porous base material body including a plurality of cells respectively passing from a first end surface to a second end surface;
    a first support portion containing ceramics as an aggregate material, and packed into a first end portion of a predetermined cell of the plurality of cells;
    a first cell seal portion containing glass, and disposed on an outer surface of the first support portion;
    a second support portion containing ceramics as an aggregate material, and packed into a second end portion of the predetermined cell;
    a second cell seal portion containing glass, and disposed on an outer surface of the second support portion;
    and a separation membrane formed on each inner surface of a plurality of cells other than the predetermined cell,
    wherein the predetermined cell is a cell having at least one of an inner defect and a distortion in a longitudinal direction.

2. A method of producing a monolithic separation membrane structure comprising:
    forming a porous base material body including a plurality of cells respectively passing from a first end surface to a second end surface;
    packing a first support portion containing ceramics as an aggregate material into a first end portion of a predetermined cell of the plurality of cells;
    forming a first cell seal portion containing glass on an outer surface of the first support portion;
    packing a second support portion containing ceramics as an aggregate material into a second end portion of the predetermined cell;
    forming a second cell seal portion containing glass on an outer surface of the second support portion;
    and a separation membrane formed on each inner surface of a plurality of cells other than the predetermined cell,
    wherein the predetermined cell is a cell having at least one of an inner defect and a distortion in a longitudinal direction.

3. The monolithic separation membrane structure according to claim 1, wherein the separation membrane is formed of an inorganic material selected from the group consisting of zeolite, carbon and silica.

* * * * *